INVENTORS
PIERRE MAGNEVILLE
CLAUDE DUCONGE
BY Craig & Antonelli
ATTORNEYS

Fig: 8

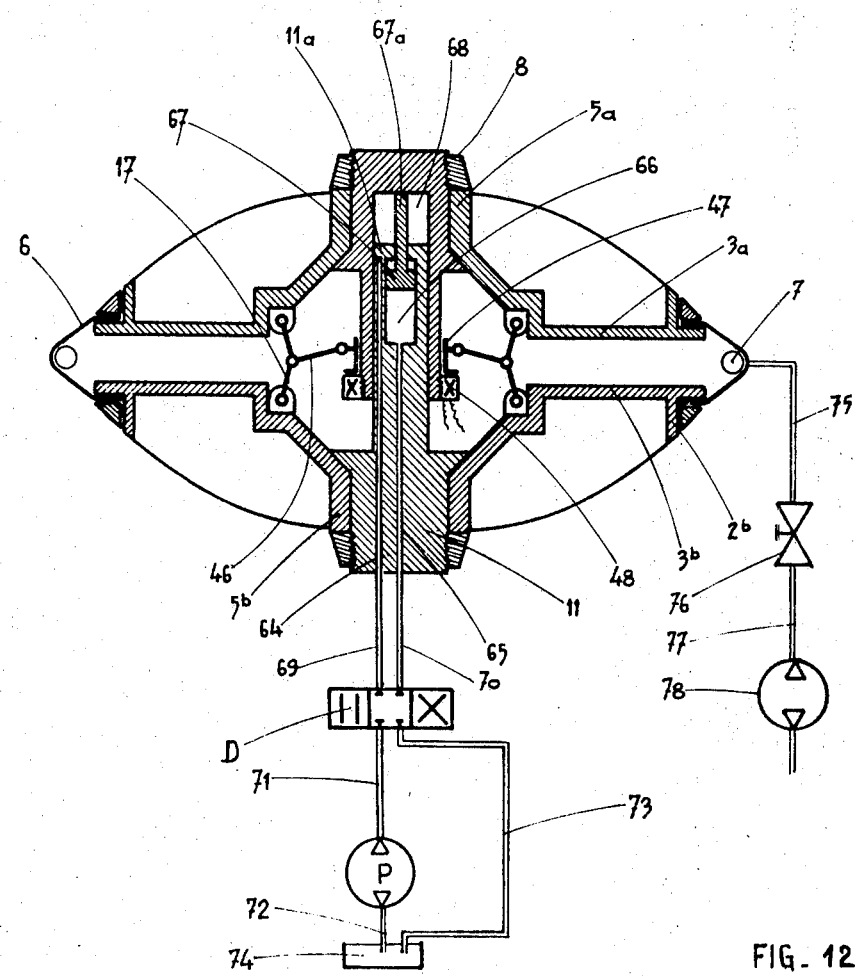

United States Patent Office 3,564,492
Patented Feb. 16, 1971

3,564,492
DEVICES FOR EMITTING ACOUSTIC WAVES IN A LIQUID MEDIUM
Pierre Magneville, Vernouillet, and Claude Duconge, Le Vesinet, France, assignors to Institut Francais du Petrole, des Carburants et Lubrifiants, Malmaison, Hauts-de-Seine, France
Filed Nov. 21, 1968, Ser. No. 777,838
Claims priority, application France, Nov. 21, 1967, 129,124
Int. Cl. H04r 23/02
U.S. Cl. 340—12
16 Claims

ABSTRACT OF THE DISCLOSURE

This device comprises at least two movable elements made of a rigid material and interconnected by a tightening membrane made of a deformable material which constitutes a tight enclosure with the movable elements. These elements have contact areas adapted to be applied intermittently against each other. Releasable means are provided for moving these elements away from each other and for locking them in spaced relationship to each other, as well as means for limiting the deformation of the membrane toward the interior of the enclosure and means for creating in this enclosure a pressure much lower than the pressure prevailing outside the enclosure.

---

A common method of underwater seismic prospecting consists of emitting acoustic waves by detonating in water at a certain depth one or several explosive charges and thereafter recording the waves which have been reflected by the different underwater geological strata, by means of a series of receivers or pick-up devices which are located in the water at different distances from the source of the explosion.

Such a method necessitates conveying and handling the quantity of explosive material which is necessary for carrying out all the operations, thus requiring special security provisions.

The main object of the present invention is to provide a source of emission of acoustic waves which is particularly suitable for underwater seismic prospecting and may be adapted to a marine vehicle.

The source of emission according to the invention is of particularly simple design and operates without using any explosive material or explosive mixture.

This source includes essentially two elements movable in opposite directions, said elements being constituted of a rigid material and being interconnected by means of a tightening membrane made of a flexible material, said membrane constituting a tight enclosure together with said movable elements, each of said elements including at least a contact area adapted to be intermittently applied against the corresponding contact area of the opposite element, this source of emission being provided with means for moving said two contact areas away from each other, means for locking said movable elements in spaced relationship with respect to each other, means for unlocking said elements, means for limiting the deformation of said tightening membrane toward the interior of said enclosure, and means for creating inside the enclosure a pressure which is much lower than that to which said enclosure is externally subjected.

When the two movable elements are forced against each other, there are generated acoustic waves which are propagated through the liquid medium.

Figure 1:
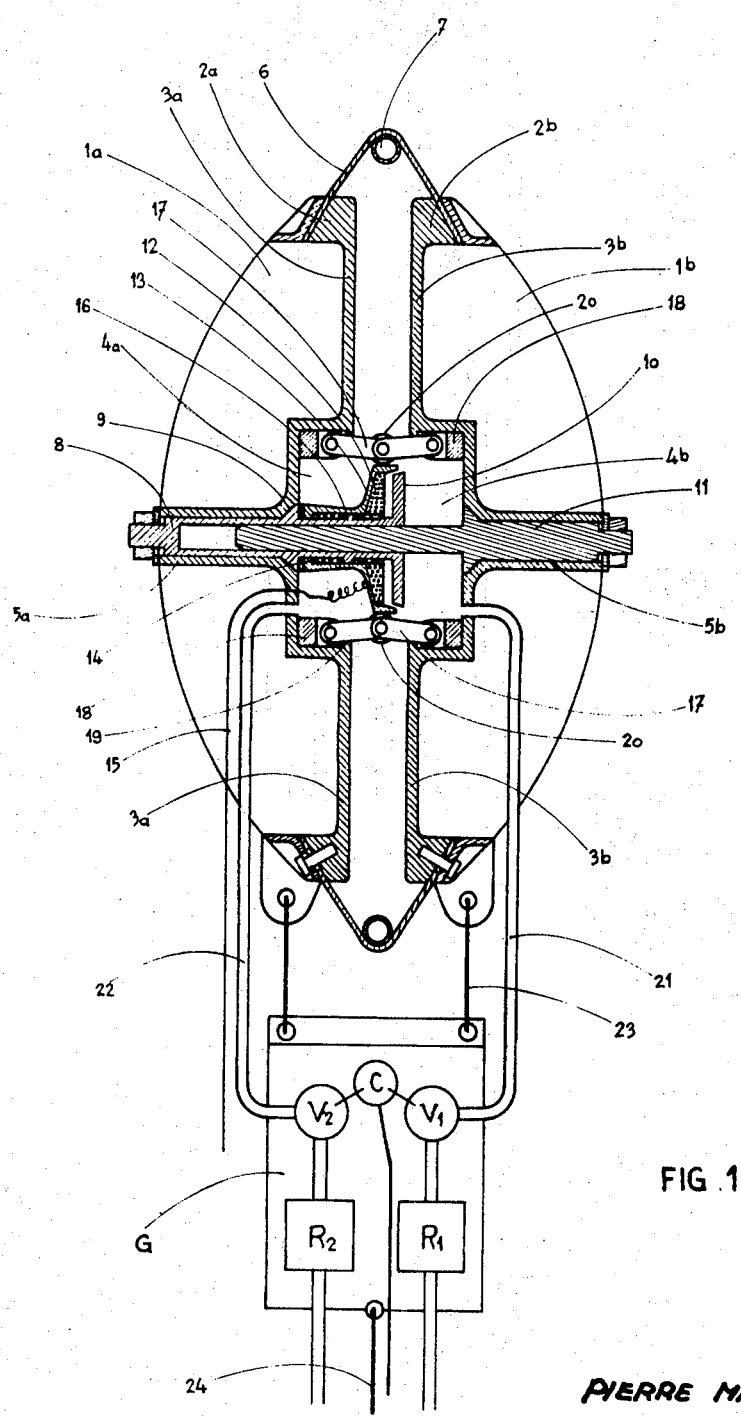
Figure 2:
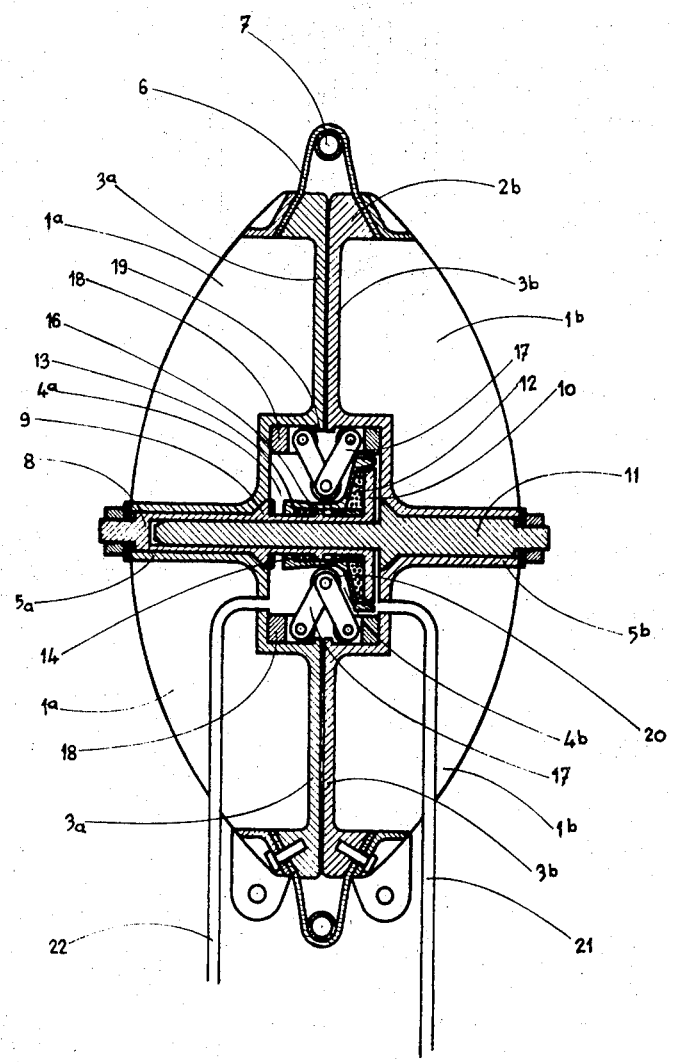
Figure 3:
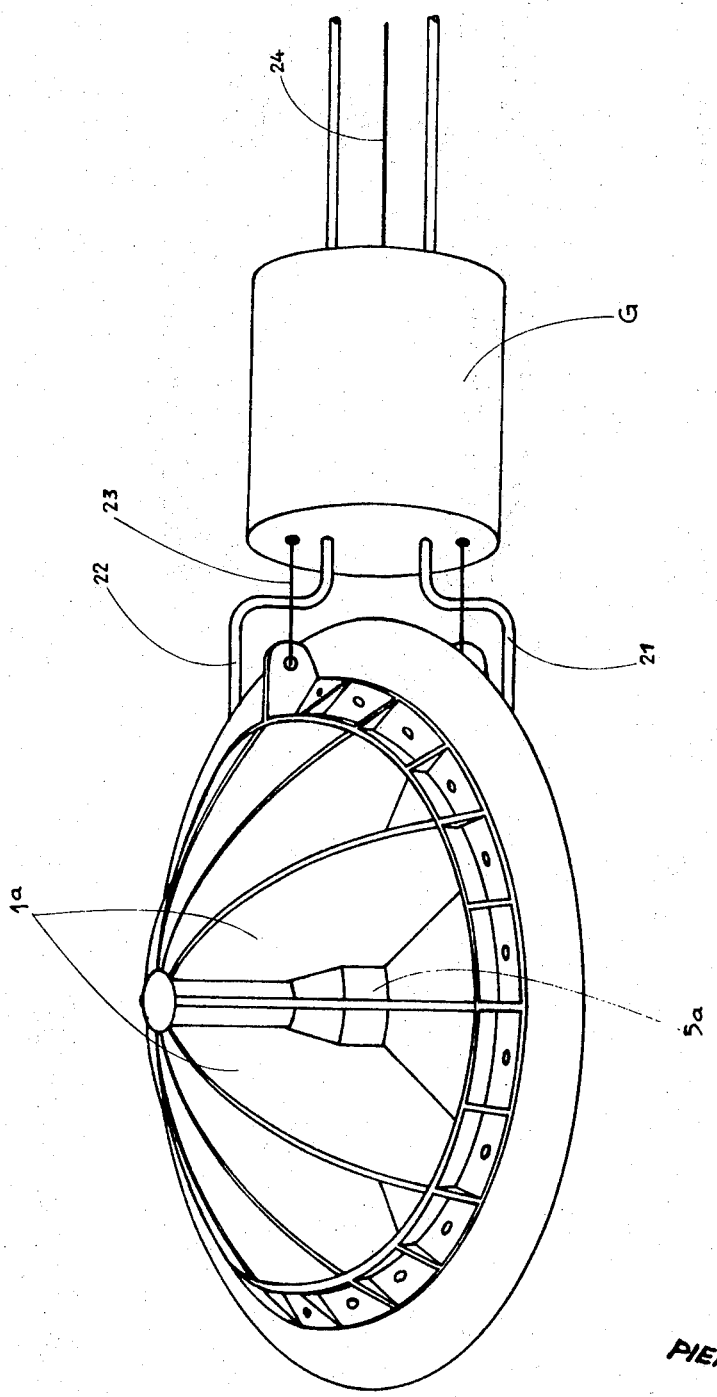
Figure 4:
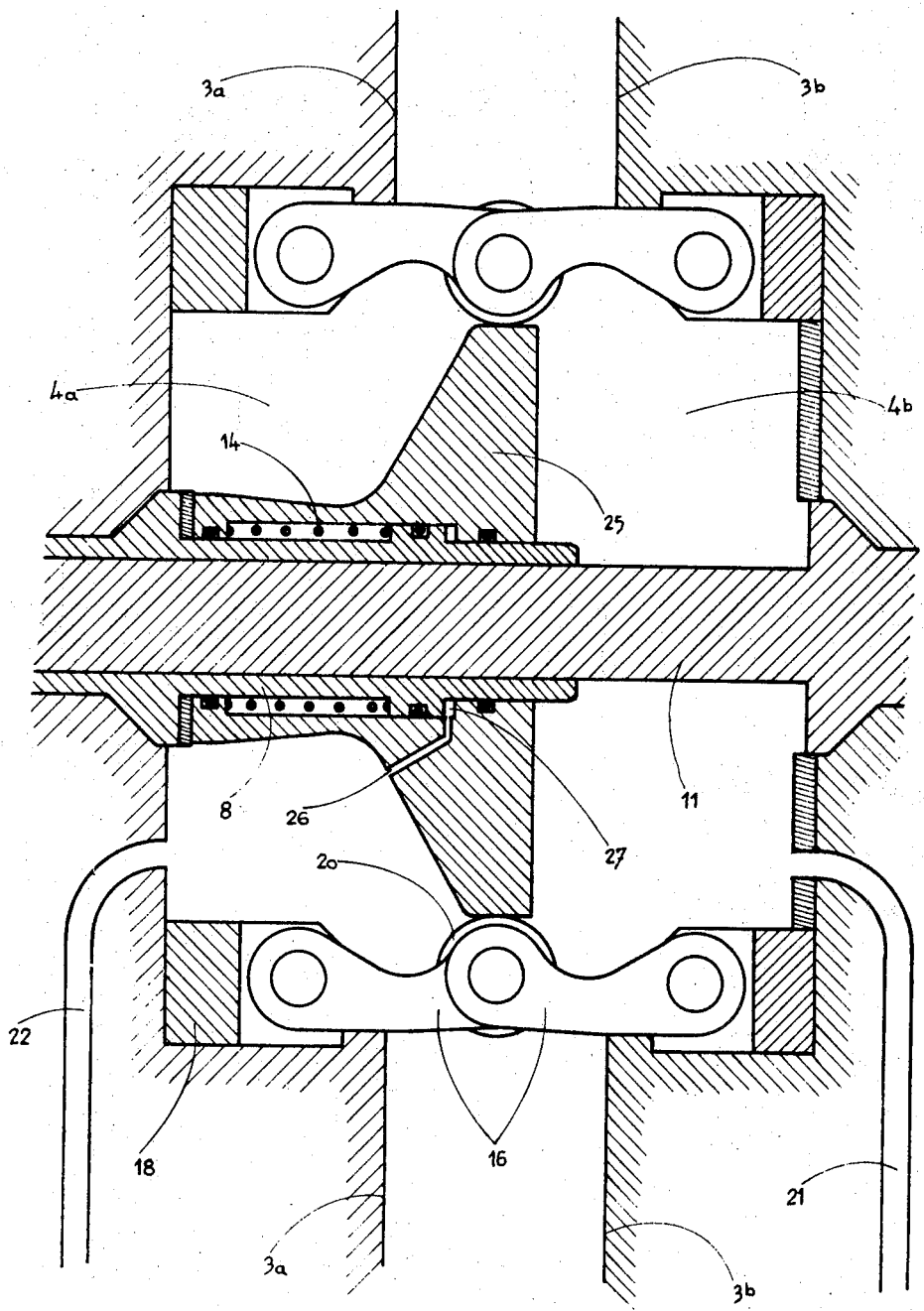
Figure 5:
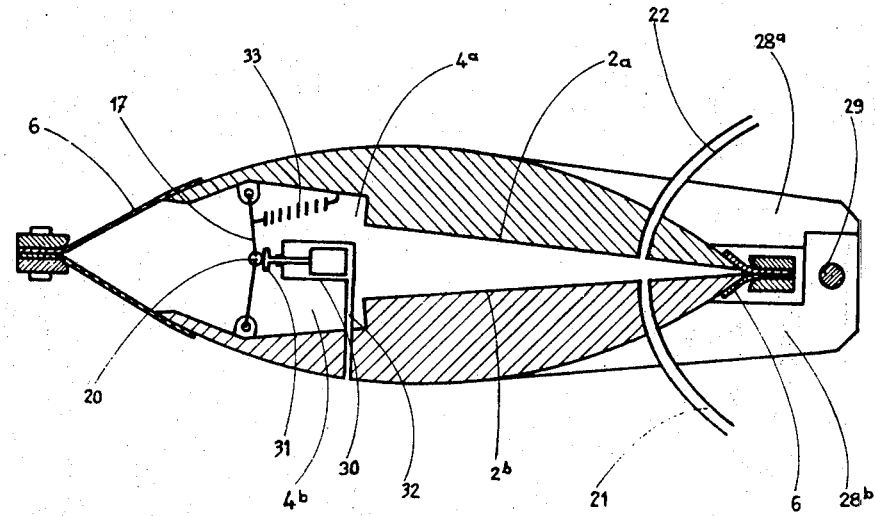
Figure 6:
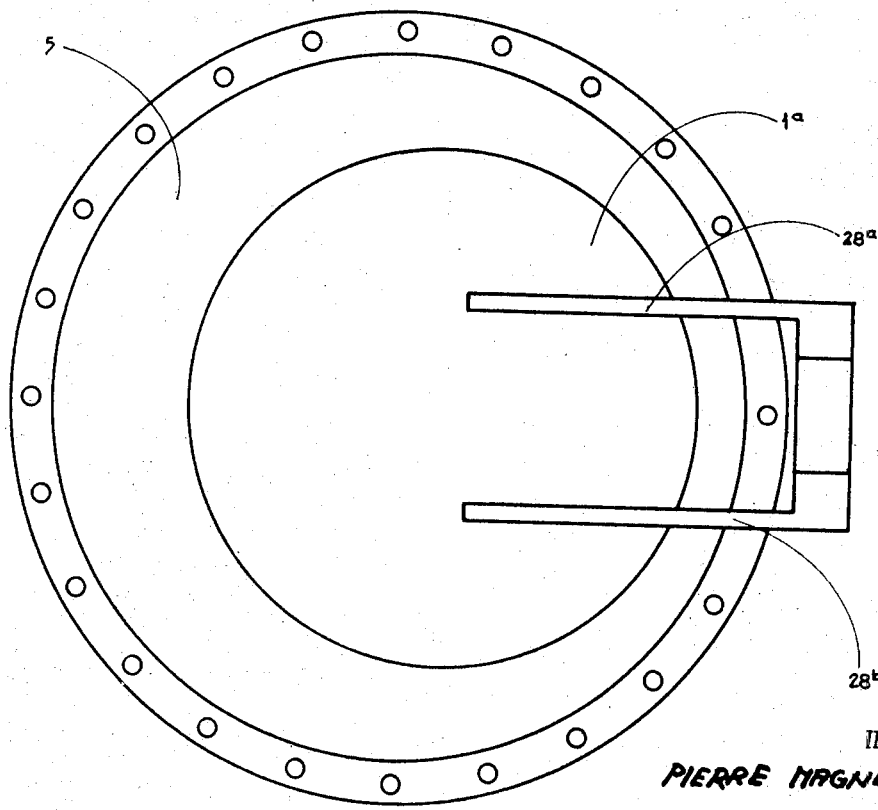
Figure 7:
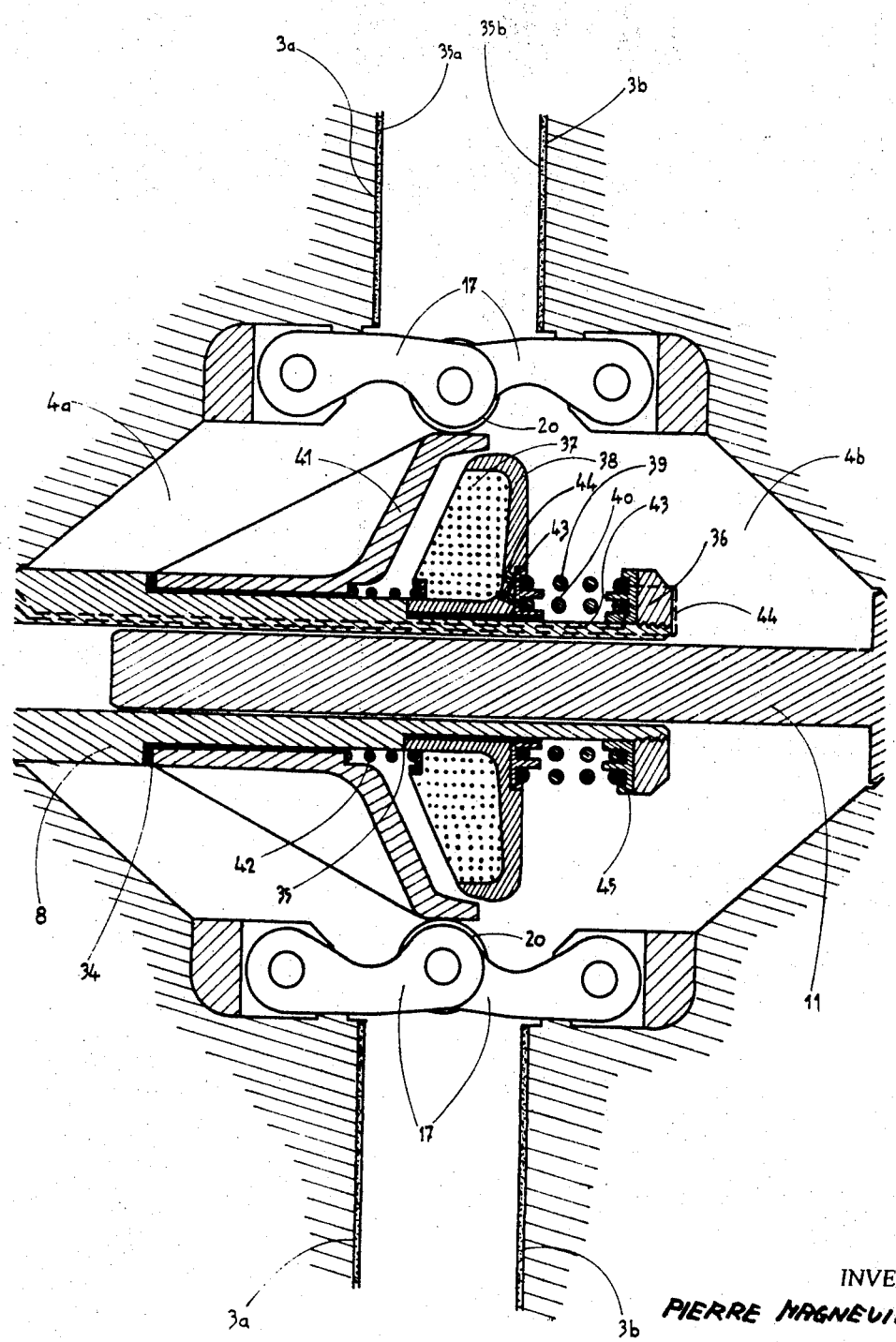
Figure 8:
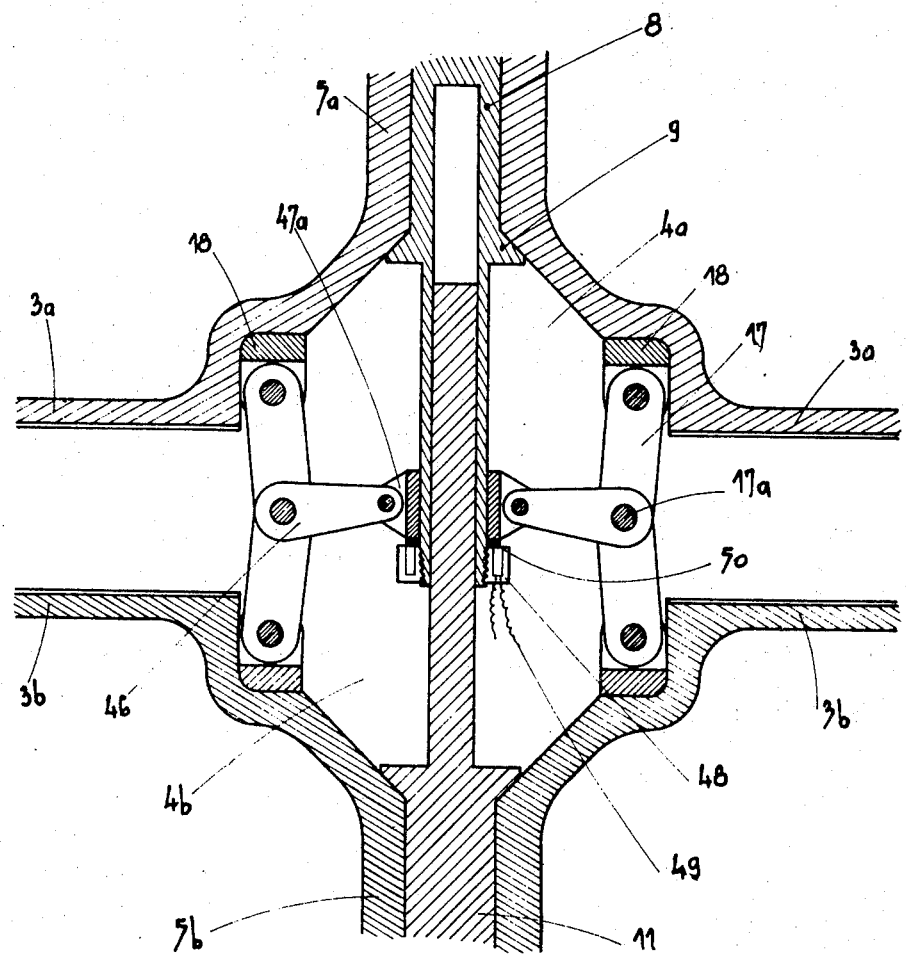
Figure 9:
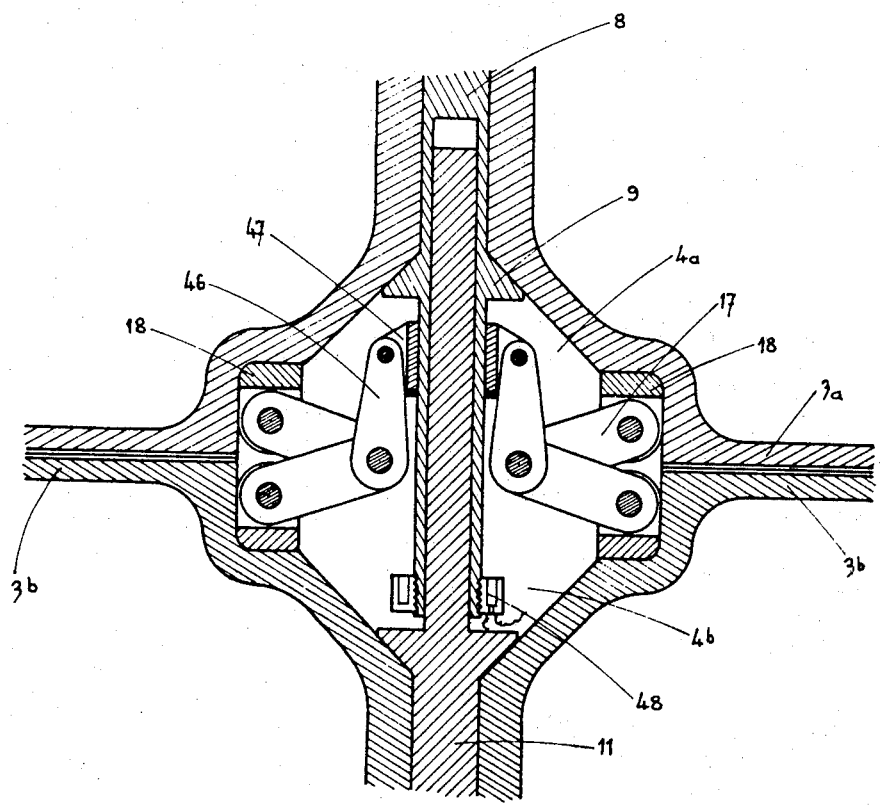
Figure 10:
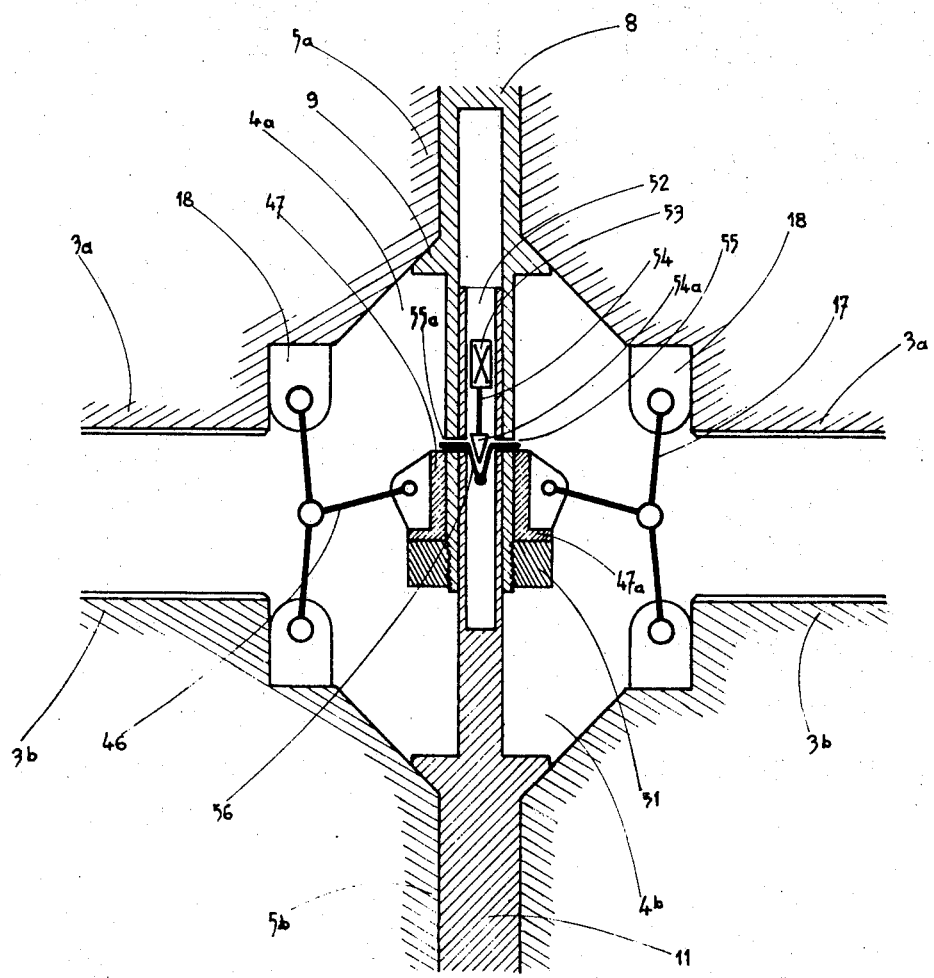
Figure 11:
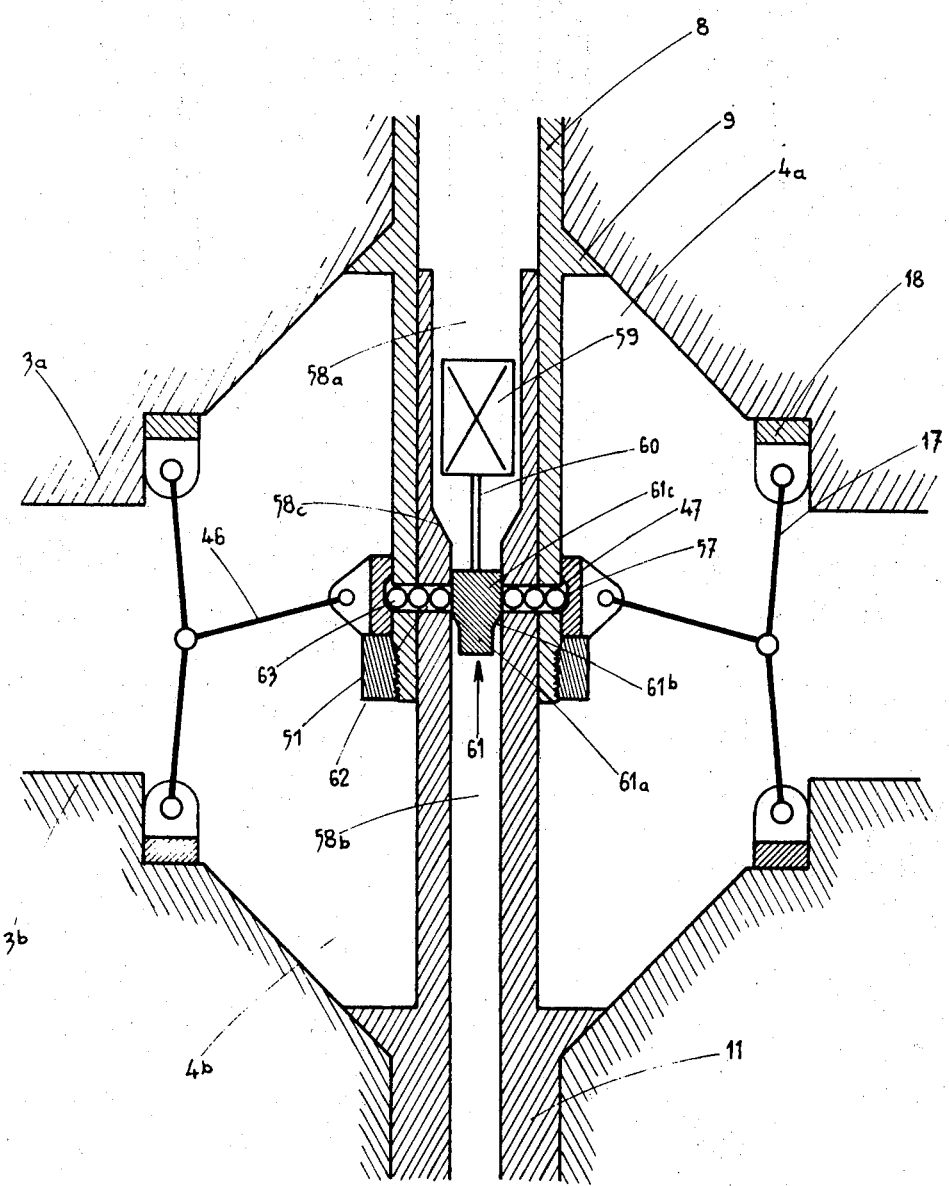

The invention will be described more in detail with reference to the accompanying drawings wherein:

FIG. 1 is a cross-sectional view of a first embodiment of the source of emission according to the invention, in the position where the movable elements are spaced from each other, and of a first embodiment of an electric device for locking and unlocking these elements and of the means for moving them away from each other, FIG. 2 is a cross-sectional view of the source of emission of FIG. 1 in the position wherein these elements are located close to each other, FIG. 3 diagrammatically shows an overall perspective view of the source of emission illustrated by FIGS. 1 and 2, FIG. 4 is a partial cross-sectional view of a fluid-controlled device for locking and unlocking the movable elements of the source of emission, FIG. 5 is a cross-sectional view of a second embodiment of the source of emission according to the invention, FIG. 6 diagrammatically shows a top view of the source of emission illustrated by FIG. 5, FIG. 7 illustrates a partial cross-sectional view of a second embodiment of an electric device for locking and unlocking the movable elements, in the position where these elements are spaced from each other, FIG. 8 is a partial cross-sectional view of a third embodiment of an electric device for locking and unlocking the movable elements, these elements being spaced from each other, FIG. 9 is a partial cross-sectional view of the device of FIG. 8, the movable elements being located close to each other, FIG. 10 is a partial cross-sectional view of a mechanical device for locking and unlocking the elements, FIG. 11 is a partial cross-sectional view of another mechanical device for locking and unlocking the movable elements, FIG. 12 is a diagrammatic view of a source of emission provided with other means for moving the elements away from each other.

The source of emission of acoustic waves, which is shown by way of example in FIGS. 1, 2 and 3 includes essentially two identical elements 2a and 2b, each of which being constituted of a plate, for example of circular shape, made of a rigid material, these elements being provided with reinforcing blades 1a, 1b.

Each plate 2 is provided with a plane area 3a, 3b such that the areas 3a and 3b of the two elements 2a and 2b may come in contact when they are moved toward each other. For example, near the center of the device, the wall of each plate 2a, 2b is provided with a recess 4a, 4b terminated with a pipe (5a, 5b) secured to the reinforcing blades 1a, 1b. This recess is adapted to house a device for automatically locking and unlocking the movable elements.

The plates 2a, 2b are interconnected by means of a flexible membrane 6 which is slightly resilient, secured to the periphery of each plate and forms therewith a tight enclosure. The membrane 6 rests on an annular element 7 which constitutes a support member and maintains the membrane outside the contact areas 3a, 3b. The width of this membrane is substantially constant along the whole periphery of the plate.

In the first embodiment shown in FIG. 1, the device for locking and unlocking the movable elements is of the electrical type. It includes, within the tube 5a, a guiding cylinder 8 integral with said tube and externally provided with two abutments 9 and 10, the latter having the shape of a circular plate and being made of a magnetic material.

In the tube 5b of the element 2b is fastened one end of a guiding rod 11, the remainder of this rod being slidably mounted in the guiding cylinder 8.

A movable coil 12 surrounded by an armature 13 is slidable along the guiding cylinder 8, between the abutment 9 and the plate 10, also used as the coil armature. The coil 12 is electrically connected with a source of current (not shown) through a conductor 15. A spring 14 located between the guiding cylinder 8 and the coil armature 13 is held in position by a flange of the armature 13 and by an abutment located between the abutment 9 and the plate 10.

Holding arms 17 which are articulated by pairs at one of their ends have their other end hinged with a linking foot member 18. The foot members are located in the recesses 4a and 4b and secured to the wall of the plates 2a and 2b, and have respective locations which are opposite two by two. When the arms 17 are most remote from each other, they are blocked by an abutment 19 provided on the plates 2, two articulated arms 17 forming a small angle (for example 5°) between each other, the common articulation of the two arms being located within the recesses 4a, 4b. Each common articulation of the holding arms is associated with a roller 20.

The recess 4b is connected through a duct 21 with a tank $R_1$ for supplying air under pressure through a valve $V_1$. The tank $R_1$ is also connected with a pressure pump (not shown) located on the mobile installation.

The recess 4a is connected through a duct 22 with a vacuum chamber $R_2$ through a valve $V_2$.

The chamber $R_2$ is also connected with a vacuum pump located on the mobile installation.

A control box C which is remotely controlled from the mobile installation provides for the automatic actuation of valves $V_1$ and $V_2$ alternatively.

The group G constituted by the tank $R_1$, the chamber $R_2$ and the valves $V_1$ and $V_2$ is connected with the device for emitting acoustic waves, through traction rods 23.

The whole system is immersed and connected with a mobile installation by means of a traction and control cable 24.

The hereinabove described device operates as follows: the elements 2a and 2b being located close to each other (FIG. 2), the plane areas 3a and 3b of the plates are in contact, the recesses 4a and 4b being interconnected.

The guiding shaft 11 penetrates substantially up to the bottom of the guiding cylinder 9. The mobile coil 12 is applied against its armature 10, the spring 14 being slightly compressed, and the arms 17 are folded by pairs, the roller 20 being located inside the recess 4a, 4b, substantially on a shoulder formed by the armature 13 of the coil 12, on the side of this armature opposite the plate 10 with respect to this coil.

Air under pressure is supplied to the recesses 4a, 4b through the duct 21, the valve $V_1$ being open. A pressure being exerted on the plate 10, the guiding cylinder is displaced with respect to the guiding shaft 11 and the elements 2a and 2b are moved away from each other by a translation moving the holding arms 17 away from each other.

Air under pressure is supplied until these arms reach their position of maximal spacing from each other.

In this position the wider part of the armature 13 surrounding the coil and forming a piston bears against the roller 20, the spring 14 being released, and keeps the arms 17 against the abutment 19 (FIG. 1), thereby locking the movable elements 2a and 2b in their open position.

In this position the vacuum pump $P_2$ and the valve $V_2$ are actuated and a vacuum is created in the space limited by the plates 2a, 2b and the tightening membrane 6.

However these plates remain spaced from each other, the arms 17 being kept in abutment by the application of the armature 13 on the rollers 20. In order to unlock or release the device at the selected time, electric current is supplied to the coil 12 through the conductor 15. The coil 12 is then applied onto the plate-armature 10, thereby compressing the spring 14, releasing the roller 20 and thus allowing the arms 17 to move. Vacuum being created between the plates 2a and 2b, these plates are attracted toward each other. The holding arms 17 are folded, the roller 20 rolling along the periphery of the armature whose profile is specially adapted therefor.

The supply of electric current may be interrupted as soon as the movement of the elements is initiated. The plane areas 3a and 3b of the planes 2a and 2b are urged abruptly against each other, thereby generating acoustic waves which propagate in the liquid medium. The plates 2a and 2b remain in this position until the following operation for moving them away from each other.

The annular support member 7 of the membrane at the periphery of the device prevents this membrane from penetrating between the plates 3a and 3b under the action of the outside-prevailing pressure.

The respective locations of the coil 12 and of the armature 10 may be inverted without changing the operation of the device.

FIG. 4 illustratives a device for locking and releasing the movable elements, which is controllable either pneumatically or hydraulically.

In this embodiment there is substituted for the coil 12 and its armatures a piston 25 displaceable with respect to the guiding cylinder 8.

The displacement of this piston with respect to the cylinder 8, in order to block or release the roller 20, is obtained by supplying the annular space 27 with fluid under pressure 27 through the pipe 26.

The other steps of the operation are the same as for the above-described device provided with a coil.

In a second embodiment of the device according to the invention, illustrated by FIG. 5, the elements 2a and 2b are connected by arms 28a, 28b articulated at one point 29.

The tightening membrane 6 secured at the periphery of each element has a smaller width in the vicinity of the point of articulation 29. In this embodiment the elements 2a and 2b are not moved away from each other by translation but by angular displacement.

The system for locking and releasing the elements may for example include holding arms 17 hinged to each other on a roller 20 and also articulated on the elements 2a and 2b respectively. A drawback spring 33 connects one of the arms 17 with one of the movable elements (for example the element 1a).

This system also includes a jack 30 housed in the recesses 4a and 4b which are provided in the elements 2a and 2b, the displacement of the piston 31 of this jack pushing the roller 20 so as to unfold the arms 17. The jack 30 is supplied with a fluid under pressure through the pipe 32.

A pump for fluid under pressure and a vacuum pump are, as in the preceding embodiment, actuated from the mobile installation, for opening and then abruptly closing the elements 2a and 2b, when the roller 20 pushed by the jack has passed its non-return position.

An electrically controlled device may be used instead of the jack, without changing the operation of the system.

The membrane 6 may be formed of two parts, for example two slightly resilient strips fixed to each other on their periphery, on the one hand, and fixed to the periphery of the elements 2a and 2b (FIG. 5), on the other hand.

FIG. 7 illustrates a second embodiment of the releasable locking device for the movable elements.

The emission device includes, as in the device illustrated by FIGS. 1 and 2, a guiding cylinder 8 integral with the plate 3a, and a guiding rod 11 integral with the plate 3b, the rod 11 being slidably mounted in the guiding cylinder 8.

According to this other embodiment, the guiding cylinder 8 is provided on its external wall with two successive shoulders 34 and 35 which constitute abutments and with another abutment 36 at its end which is located opposite the plate 3a. A mobile coil 37 surrounded by an armature 38 is slidable along the cylinder 8, between the abutments 35 and 36. Two electrically conductive springs 39 and 40, located between the armature 38 and the abutment 36 and resting on insulating elements 45 keep the coil 37 against the abutment 35 in the stand-by position.

A magnetic element 41 of annular shape is slidably mounted on the guiding cylinder 8, between the abutment 34 and the coil 37, a spring 42 providing, under normal conditions, for a certain spacing between the magnetic element 41 and the coil 37.

The mobile coil 37 is supplied with electric current through conductors 43 and 44 and through the springs 39 and 40, for example.

When the plates 3a and 3b are spaced apart from each other (FIG. 7), the rollers 20 associated with the common articulation of the holding arms 17, rest on the part of largest diameter of the magnetic element 41.

At the time selected for suddenly urging against each other the plates 3a and 3b, an electric current is supplied through the conductors 43, 44. The magnetic element 41 slides along the cylinder 8, thereby compressing the spring 42, and comes to bear against the coil 37.

As a result of its displacement the element 41 releases the roller 20, thereby allowing the arms 17 to move. The roller 20 rolls along the contour of the element 41, this contour being so adapted as to provide for the folding of the arms 17. The water pressure against the external wall of the plates 3a and 3b accelerates this movement. The element 41 continues to slide while bearing on the coil 37 and its armature 38 which both slide in turn along the cylinder 8, thereby compressing the springs 39 and 40 until they are stopped by the abutment 36.

Moreover, in the device illustrated in FIG. 7, the contact areas of the plates 3a and 3b are coated with a layer of an elastic material, indicated by 35a and 35b respectively.

As a matter of fact, it has been discovered that such a coating substantially improves the efficiency of the source of emission.

According to FIG. 8, which illustrates a third embodiment of an electric device for locking and releasing the mobile elements, the lower part of the cylinder 8 is threaded on its external wall. A ring-shaped electromagnet 48, connected with a non-illustrated source of current through the conductors 49 is screwed on the threaded part of the cylinder 8.

The locking and releasing device includes four holding arms 17, each hindgedly secured to an articulation foot member 18 and articulated by pairs. On the articulation shaft 17a of each pair of arms is hingedly mounted one end of a third control arm 46. The other end of this last-mentioned arm is articulated on a bracket 47a of a ring 47 made of a conducting material which is externally slidable along the cylinder 8.

A washer 50, also made of a conducting material, is mounted with a slight clearance on that end of the ring 47 facing the electro-magnet 48.

When the plates 3a and 3b are spaced from each other, the ring 47 rests on the electro-magnet 48 through the washer 50. As a result of its clearance this washer can be exactly applied against the opposite end of the electro-magnet. This electro-magnet which is supplied with electric current, maintains the ring 47 in its lower position. In this position the arms 46 make a very small angle with the direction of the plates 3, and the arms 17 also make a small angle between each other.

At the time selected for suddenly urging the plates 3a and 3b into contact with each other, the selective supply of the electro-magnet is interrupted. The ring 47 is then released. As a result of the vacuum created between the two plates, in an analogous manner as in the device of FIG. 1 and under the action of the external hydrostatic pressure, the holding arms 17 are suddenly folded. During this movement they exert a thrust on the arms 46, this thrust being applied in turn on the ring 47 which is made to slide along the cylinder 8 into the recess 4a, to a position which depends on the design of the system (FIG. 9).

It must be noticed that, as the case may be, there may be used instead of the electro-magnet 48 a permanent magnet the action of which can be cancelled at the time selected for releasing the arms by supplying through the conductors 49 an electric current which demagnetizes this magnet.

FIG. 10 shows the device provided with a mechanical system for locking and releasing the mobile elements and including, as in the preceding embodiments, a guiding cylinder 8 integral with the plate 3a and a guiding rod 11 integral with the plate 3b, this rod 11 being slidable in the cylinder 8 and, as in the embodiment of FIG. 8, a holding system with six arms articulated by three and a ring 47 slidable along the cylinder 8.

The rod 11 is provided at its upper part over some length thereof with an inner cylindrical cylinder 8. In this bore can slide a piston, for example under the action of a jack 53, the end of the piston rod 54 being provided with a needle 54a.

Apertures 55a are provided transversely from side to side in an axial plane of the cylinder 8 and of the rod 11 in such a manner that, when the device is in the position of maximum spacing of the movable elements from each other, these orifices register with one another.

In this position small feather keys 55 interconnected by a V-shaped spring 56 inside the bore 52, are introduced into these apertures 55a. This spring is constituted of two blades interconnected at one of their ends and each secured to one of the feather keys at their other end.

If no force is exerted on the spring, the two blades are close to each other and consequently the two feather keys are released from the apertures 55a of the cylinder 8.

The ring 47 is provided at its end located near the rod 11 with a circular shoulder 47b which rests on a ring 51 screwed on the threaded lower part of the cylinder 8, when the movable elements are at the maximum spacing from each other.

Instead of the pneumatic or hydraulic jack 53 actuating the needle 54a, there might also be used a magnetic device, for example, or any other driving device.

When the plates 3a and 3b are spaced apart from each other, the ring 47 rests on the ring 51.

The jack 53 is so actuated that the needle 54a is introduced between the two blades of the spring 56, urging them away from each other.

The feather keys then project outside the cylinder 8, thereby blocking the crown 47 in its position.

At the time selected for suddenly urging the plates 3a and 3b into contact with each other, vacuum is created and the jack is actuated in the reverse direction so that the needle 54a no longer urges the blades of the spring 56 away from each other. The feather keys secured to this spring then return to the inner bore 52, thereby releasing the ring 47 and allowing the rod 11 to freely slide within the cylinder 8. The ring 47 is then moved toward that end of the cylinder 8 which is opposite to the ring 51 and the rod 11 slides in the cylinder 8.

FIG. 11 shows the device provided with another mechanical locking system which includes, as in the preceding embodiment, a guiding cylinder 8 integral with the plate 3a and a guiding rod 11 integral with the plate 3b, this rod 11 being slidably mounted in the cylinder 8 and, as in the embodiment of FIG. 8, a holding system with six arms articulated by three and a ring 47 slidable along the cylinder 8.

In the embodiment of FIG. 11, the guiding rod 11 is provided with a cylindrical bore 58 comprising two parts 58a and 58b of different diameters interconnected by a shoulder 58c which has the shape of a truncated cone. In the part 58a having the greatest diameter and communicating with the interior of the cylinder 8, a rod 60 can slide, for example under the action of a jack 59, the end of this rod being secured to a piston 61 which is slidable in the part 58b of the bore. This cylindrical piston 61 comprises two parts 61a and 61c of different diameters interconnected through a part 61b having the shape of a truncated cone. The part 61c has a diameter 61 adjusted to that of the part 58b of the bore.

Apertures 62 are provided transversely in an axial plane throughout the cylinder 8 and of the rod 11 in such a manner that these apertures register when the device is in the position of maximum spacing of the movable elements from each other.

In this position balls 63 (for example six) are introduced into these apertures, the diameter of these balls being substantially equal to that of the apertures 62.

They are for example housed three by three in each aperture on both sides of the bore 58.

They are of such diameter that the thickness provided by the balls located adjacent to each other is greater than the overall thickness of the cylinder 8 and of the part 58b of the bore.

Consequently when the wall of one of the inner balls is in line with that of the bore 58b the outer ball projects partly outside the aperture on the side of the external wall of the cylinder 8.

A ring 51 is screwed on the threaded end of the cylinder 8. It should be noticed that instead of the pneumatic or hydraulic jack 59 which actuates the piston 61 there might also be used any other driving device, such as, for example, a magnetic device.

When the plates 3a and 3b are spaced from each other, the ring 47 rests on the ring 51. The part 61c of the piston is located at the level of the apertures 62.

As a result of the overall thickness provided by the balls, the balls located at the periphery, which project partly out of the external wall of the cylinder 8, are engaged into a circular groove 57 provided in the ring, thereby blocking the latter.

At the time selected for suddenly urging the plates 3a and 3b into contact with each other, the jack 59 is actuated, so that the part 61a of the piston which is associated with this jack comes to the level of the apertures 62. The inclined edges of the groove 57 convert the axial thrust to which the ring 47 is subjected, through the arms 17 and 46, into a centripetal thrust which is transmitted to the balls. The rows of balls are displaced until the two balls located on the side of the bore 58 come to bear against the part 61a of the piston. The crown 47 which is thus released is displaced toward the interior of the recess 4a. At this time the ball located at each end of the common aperture 62 is housed in the lateral thickness of the wall of the cylinder 8, the four other balls of the row being housed in the lateral thicknesses of the walls of the rod 11.

Consequently they do not hinder the sliding motion of the rod 11 in the cylinder 8 during the period wherein the elements 2a and 2b are urged into contact with each other.

During this period, the ring 47 no longer registers with the apertures 62.

In order to prevent the two peripheral balls housed in the thickness of the walls of the cylinder 8, which are then no longer blocked externally, from leaving completely the apertures, the section of the latter is reduced on the external wall of the cylinder 8.

In the embodiment of FIG. 11 the locking system is provided with only one lateral aperture and one row of six balls.

It will be obviously possible, in order to strengthen the locking system, to provide a plurality of identical apertures located in different axial planes.

Referring now to FIG. 12, which illustrates another embodiment of a system for moving the elements 2a and 2b away from each other, the device includes, as in the preceding embodiment, a guiding cylinder 8 integral with the plate 3a and a guiding rod 11 integral with the plate 3b, the rod 11 being slidable in the cylinder 8. The device also includes a releasing system of the type illustrated by FIG. 8.

In this embodiment the rod 11 includes a cylindrical inner chamber 66. A piston 67 is slidably mounted in this chamber and its rod 67a is itself slidable in a suitable bore of the end wall 11a of the rod 11.

The chamber 66 is provided with two apertures one of which is provided at that end of this chamber which is closed by the wall 11a and the other at the opposite end, on the other side of the head of piston 67, these apertures connecting the chamber 59 with the pipes 64 and 65 which are in turn respectively connected through the conduits 69 and 70 with the two outlets of a distributor D having one inlet supplied with oil under pressure from a tank 74 through the pipes 71 and 72 and a pump P, the other inlet providing for the return to the tank 74 through the conduit 73. The rod 67a of the piston 67 bears on the external end wall of the cylinder 8.

FIG. 12 also illustrates diagrammatically a draining system.

At a point of the periphery of the membrane 6 is provided an aperture through the annular element 7, this aperture connecting the interior of the device with a draining valve 76 having several ways and with a vacuum pump 78 connected in series, through conduits 75 and 77.

This system makes it possible, through successive releasings, to drain from the device the water which might have been introduced thereinto and to improve the vacuum provided in the enclosure before operating the device.

The operation of the device is as follows:

When it is desired to move the plates 3a and 3b away from each other, the pump P is actuated and injects oil under pressure through the conduits 70 and 71 and the pipe 65 into the chamber 66.

The head of the piston 67 is pushed toward the wall 11a. The piston rod 67a, which is integral with the guiding rod 11 comes into abutment against the end wall of the cylinder 8 and pushes it away.

During this time the oil located between the piston head and the wall 11a is expelled through the pipe 69, the distributor and the conduit 73 to the tank 74. The plates 3a and 3b are moved away from each other until the ring 47 comes to rest onto the electromagnet 48 which then holds it in this position.

When this blocking position is reached, the pump injects oil under pressure through the distributor and the pipes 71 and 69 between the piston head and the wall 11a. The piston is moved away from the latter, thereby expelling the oil located ahead of the piston through the pipe 65, the distributor D and the conduits 70 and 73 toward the tank 74.

The stroke of the piston 67 is at least equal to the maximal spacing between the plates 3a and 3b.

When the two above-described operations have been completed the device is ready to be actuated.

It should be noticed that the two plates 3a and 3b, connected along their periphery through the membrane 6, constitute a closed chamber or enclosure. Consequently, the device which is used in this embodiment for spacing the plates, makes it possible by increasing the volume of this chamber to further decrease the residual pressure prevailing in this chamber and thus to increase the efficiency of the device.

Irrespective of the way of operating the source of emission according to the invention, the pressure prevailing in the enclosure must be lower than the outer pressure exerted on this enclosure at the time when the movable elements are unlocked.

We claim:

1. Device for emitting acoustic waves in a liquid medium, comprising at least two elements movable in two opposite directions, said elements being made of a rigid material and interconnected by a tightening membrane made of a deformable material, constituting a tight enclosure with said movable elements, each of said elements including at least a contact area adapted to be applied intermittently against a corresponding contact area of the opposite elements, means for moving said contact areas away from each other, means for locking said movable elements in spaced relationship to each other, means for unlocking said elements, means for limiting the deformation of said tightening membrane toward the interior of said enclosure, and means for creating inside said enclosure a pressure much lower than the pressure which is applied externally to said enclosure.

2. Emitting device in accordance with claim 1, wherein said means for moving said mobile elements away from each other includes means for supplying a fluid under pressure into said enclosure.

3. Emitting device in accordance with claim 1, wherein said means for moving said elements away from each other includes a jack which is supplied with a fluid under pressure and comprises a cylinder integral with one of said movable elements and a piston integral with the other of said two movable elements and slidable in said cylinder.

4. Emitting device in accordance with claim 1, wherein said means for locking and for unlocking include
  (a) holding arms each articulated on one of said movable elements and having by pairs a common articulation provided with a roller,
  (b) abutments for stopping said holding arms in spaced relationship to each other,
  (c) a mobile piston forming an abutment for each of said rollers when said holding arms are spaced from each other and adapted to release said rollers to allow for the folding of said arms.

5. Emitting device in accordance with claim 4, wherein said mobile piston is constituted by the armature of a mobile electric coil supplied with an electric current and resting against another fixed armature.

6. Emitting device in accordance with claim 4, wherein said mobile piston is constituted by the armature of a mobile electric coil supplied with an electric current and resting against another mobile armature.

7. Emitting device in accordance with claim 4, wherein said mobile piston is actuated by a fluid pressure system.

8. Emitting pressure in accordance with claim 1, wherein said means for locking and for unlocking include
  (a) holding arms each articulated on one of said movable elements and articulated with each other by pairs,
  (b) control arms, each articulated on the one hand on the common articulation axis of one of said pairs and on the other hand on a sliding ring,
  (c) a magnetic system for locking and unlocking said ring.

9. Emitting device in accordance with claim 1, wherein said locking and unlocking means include
  (a) holding arms, each articulated on one of said movable elements and articulated with each other by pairs,
  (b) control arms, each articulated on the one hand on the common articulation axis of one of said pairs and on the other hand on a sliding ring,
  (c) feather keys connected by a spring cooperating with a mobile needle for locking and unlocking said ring.

10. Emitting device in accordance with claim 1, wherein said locking and unlocking means include
  (a) holding arms each articulated on one of said movable elements and articulated with each other by pairs,
  (b) articulated control arms each articulated on the one side on the common articulation axis of one of said pairs and, on the other hand on a sliding ring provided with a circular groove on its internal wall,
  (c) a set of balls actuated by a piston and cooperating with said circular groove for locking and unlocking said ring.

11. Emitting device in accordance with claim 1, wherein said means for creating inside said enclosure a lower pressure than that exerted externally on the enclosure are constituted of a system for blowing off at least a part of the fluid contained in said chamber.

12. Emitting device in accordance with claim 1, wherein said means for creating inside said enclosure a lower pressure than that exerted externally on the enclosure are constituted of said means for moving said movable elements away from each other.

13. Emitting device in accordance with claim 1, wherein said means for limiting the deformation of said tightening membrane toward the interior of said enclosure include an annular support element associated with said membrane.

14. Emitting device in accordance with claim 1, wherein said movable elements are provided with a recess for housing said locking and unlocking means.

15. Emitting device in accordance with claim 1, wherein said contact areas are provided with a coating made of an elastic material.

16. Emitting device in accordance with claim 3, wherein said means for creating inside said enclosure a lower pressure than that exerted externally on the enclosure are constituted of said means for moving said movable elements a way from each other.

References Cited

UNITED STATES PATENTS

| | | | |
|---|---|---|---|
| 1,753,368 | 4/1930 | Du Bois-Reymond et al. | 181—.5 |
| 2,081,619 | 5/1937 | Ebert | 340—8UX |
| 2,962,695 | 11/1960 | Harris | 340—11X |
| 3,392,369 | 7/1968 | Dickie et al. | 340—12 |

RODNEY D. BENNETT, Primary Examiner

B. L. RIBANDO, Assistant Examiner

U.S. Cl. X.R.

181—.5